(12) United States Patent
Takezawa

(10) Patent No.: US 12,072,063 B2
(45) Date of Patent: Aug. 27, 2024

(54) SAFETY JOINT

(71) Applicant: TATSUNO CORPORATION, Tokyo (JP)

(72) Inventor: Masahiro Takezawa, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 0 days.

(21) Appl. No.: 17/563,593

(22) Filed: Dec. 28, 2021

(65) Prior Publication Data

US 2022/0214016 A1 Jul. 7, 2022

(30) Foreign Application Priority Data

Jan. 6, 2021 (JP) ................................. 2021-000751

(51) Int. Cl.
*F17C 13/04* (2006.01)
*F17C 7/00* (2006.01)

(52) U.S. Cl.
CPC ................ *F17C 13/04* (2013.01); *F17C 7/00* (2013.01); *F17C 2205/0332* (2013.01); *F17C 2221/012* (2013.01); *F17C 2260/04* (2013.01); *F17C 2265/065* (2013.01); *F17C 2270/0184* (2013.01)

(58) Field of Classification Search
CPC .... F17C 13/04; F17C 7/00; F17C 2250/0332; F17C 5/06; F17C 2205/037; F16L 55/1007; F16L 37/32; F16L 37/367; F16L 35/00; F16L 55/1015; F16L 57/005; F16L 37/35; F16L 29/04; B67D 7/3218
USPC ....................................................... 141/346
See application file for complete search history.

(56) References Cited

U.S. PATENT DOCUMENTS

| 2,637,572 | A | * | 5/1953 | Bruce | ................. | F16L 37/0848 |
| | | | | | | 251/340 |
| 4,991,626 | A | * | 2/1991 | Grantham | ........... | F16L 55/1015 |
| | | | | | | 137/614.03 |
| 5,285,807 | A | * | 2/1994 | Nitzberg | ................. | B67D 7/04 |
| | | | | | | 137/614.04 |
| 10,704,725 | B2 | * | 7/2020 | Takezawa | ........... | F16L 55/1015 |

(Continued)

FOREIGN PATENT DOCUMENTS

JP 2006097874 A * 4/2006
JP 2014190520 A * 10/2014

OTHER PUBLICATIONS

JP-2006097874-A English Translation of Specification (Year: 2024).*

(Continued)

*Primary Examiner* — Reinaldo Sanchez-Medina
*Assistant Examiner* — Stephanie A Shrieves
(74) *Attorney, Agent, or Firm* — Stetina Brunda Garred & Brucker

(57) ABSTRACT

To provide a safety joint that can immediately shut off a hydrogen gas flow path at the initial stage when a plug, which is a nozzle side member, comes out of a socket, which is a filling apparatus side member, to prevent release of outgas. A safety joint including: a cylindrical nozzle side member with a flow path formed inside, a shutoff valve of the nozzle side member opens when the nozzle side member is connected to a filling apparatus side member; and the filling apparatus side member with a cylindrical shape and a flow path formed inside, the filling apparatus side member can be connected to the nozzle side member.

8 Claims, 9 Drawing Sheets

(56) References Cited

U.S. PATENT DOCUMENTS

| | | | |
|---|---|---|---|
| 11,644,154 B2* | 5/2023 | Takezawa | F16L 55/1007 |
| | | | 141/346 |
| 2018/0172191 A1* | 6/2018 | Takezawa | F16L 27/06 |
| 2019/0017640 A1* | 1/2019 | Takezawa | B67D 7/3218 |
| 2022/0163152 A1* | 5/2022 | Takezawa | F16L 35/005 |

OTHER PUBLICATIONS

JP-2014190520-A English Translation of Specification (Year: 2024).*

* cited by examiner

SAFETY JOINT

CROSS-REFERENCE TO RELATED APPLICATIONS

The present application claims priority to JP2021-000751 filed on Jan. 6, 2021, the disclosure of which is incorporated herein by reference.

STATEMENT RE: FEDERALLY SPONSORED RESEARCH/DEVELOPMENT

Not Applicable

BACKGROUND

1. Technical Field

The present invention relates to a filling apparatus for filling gas such as hydrogen gas used as fuel. More particularly, the present invention relates to a pipe joint for separating the filling apparatus and a gas filling nozzle from each other in an emergency while a gas is filled with the filling apparatus.

2. Description of the Related Art

For example, as show in FIG. 8, to a vehicle 400 using hydrogen as fuel, at a hydrogen filling station is filled hydrogen gas after a filling nozzle 202 attached to an end of a filling hose 201 of a hydrogen filling apparatus 200 and a vehicle side filling port 203 are connected with each other. The filling is performed while being controlled depending on the maximum using pressure of a hydrogen tank 204 mounted to the vehicle 400. Here, when the vehicle 400 runs to pull the filling hose 201 while hydrogen gas is filled, for instance, parts such as the filling nozzle 202 and the filling hose 201 are broken to inject a hydrogen gas, so that it becomes a dangerous condition. Then, a pipe joint 100 for emergency releasing is mounted between the hydrogen filling apparatus 200 and the filling hose 201, and when to the filling hose 201 is applied a tensile force more than a predetermined value, the pipe joint 100 for emergency releasing is divided to prevent the parts such as the filling nozzle 202 and the filling hose 201 from being broken.

As a prior art, the present applicant proposed a pipe joint for emergency releasing including: a cylindrical plug (filling nozzle side member) in which a flow path is formed; a cylindrical socket (filling apparatus side member) in which a flow path is formed; and when the plug is inserted into the socket, shutoff valves open the flow paths of the plug and the socket to communicate the flow paths with each other, and when the plug is disconnected from the socket, the shutoff valves close. In the pipe joint for emergency releasing, central axes of the flow paths of the plug and the socket do not form the same straight line; when the plug is inserted into the socket, an end of a socket side valve stem (an end, opposing the end of the socket side valve stem, of a valve element) contacts with a plug side rod accommodating case and a valve element mounted to the other side of the socket side valve stem is held at a position separated from a socket side valve seat against an elastic repulsive force of an elastic body on the socket side, and a locking member held in the plug side rod accommodating case is restricted to move radially outward by an inner wall at a socket body side opening, and a plug side valve stem contacts with the locking member and does not move toward the socket side, and a valve body provided on the plug side valve stem is held at a position separated from a plug side valve seat against an elastic repulsive force of an elastic body on the plug side (refer to Patent Document 1). This pipe joint (disclosed in the Patent Document 1) is very useful.

However, in the pipe joint 100 (of the Patent Document 1), when a large tensile force acts on the filling hose 201 (shown in FIG. 8), and as shown in FIG. 9, at an initial stage of the process that the plug 10 is pulled out from the socket 22 (the stage at which the plug 10 starts to come out), the socket side rod 22 connected to the valve body 25 on the socket 20 side is placed on the plug side valve stem 2 or a cover member 3 of the valve stem. Under the condition (the state shown in FIG. 9), the socket side valve body 25 positions separately from the socket side valve seat 21E against an elastic repulsive force of a spring 23 on the socket 20 side, which causes the socket side shutoff valve 24 to be held in an open state. For that reason, at the initial stage where the plug 10 is ejected from the socket 20 (the stage where the plug 10 is beginning to be ejected), a high-pressure hydrogen gas supplied from the filling apparatus 200 (FIG. 8) through the opening portion 21C on the socket 20 side flows out to the outside of the pipe joint 100 as a so-called "outgas". In FIG. 9, the outflow of the outgas is indicated by the arrow OG.

Prior Art document Japan Patent No. 6540967

BRIEF SUMMARY

The first to third inventions of the present application have been made in consideration of the above problems in the prior art, and the object thereof is to provide a safety joint that can immediately shut off a hydrogen gas flow path at the initial stage when a plug, which is a nozzle side member, comes out of a socket, which is a filling apparatus side member, to prevent release of outgas.

A safety joint (100) according to the first invention of the present application includes: a cylindrical nozzle side member (plug 10) with a flow path (plug side flow path R10) formed inside, a shutoff valve (plug side shutoff valve V10) of the nozzle side member (10) opens when the nozzle side member (10) is connected to a filling apparatus side member (socket 20); and the filling apparatus side member (20) with a cylindrical shape and a flow path (socket side flow path R20) formed inside, the filling apparatus side member (20) can be connected to the nozzle side member (10), and when the nozzle side member (10) is disconnected from the filling apparatus side member (20), the shutoff valve (V10) of the nozzle side member (10) closes and the flow path (R20) of the filling apparatus side member (20) closes, the safety joint (100) (for emergency releasing) is characterized in that: central axes of the flow paths (R10, R20) of the nozzle side member (10) and the filling apparatus side member (20) are arranged orthogonally; the nozzle side member (10) has a protruding portion (plug side protruding portion 12) with a diameter smaller than a region in which a valve body (plug side valve body 3) is housed, and the protruding portion (12) is formed with a through hole (12T) that communicates the flow path (14, 15) of the nozzle side member (10) and the flow path (222, 223) of the filling apparatus side member (20); the filling apparatus side member (20) has an opening portion (through hole 220) into which the protruding portion (12) of the nozzle side member (10) is inserted, the opening portion (220) extending in a direction orthogonal to the flow path of the filling apparatus side member (20); the opening portion (220) is provided with a slidable closing member (8) and an elastic member (socket side spring 9) that urges the closing member (8) in a direction that the nozzle side member (10) comes off; and the safety joint (100) further incudes a closing member holding mechanism that holds the closing member (8) at a position separated from the nozzle side member (10) when the nozzle side member (10) and the filling apparatus side member (20) are connected.

In the first invention, it is preferable that the safety joint (100) further includes an extension portion (24) having a space (243) in which the opening portion (220) is extended in an opposite direction of the nozzle side member (10), and the closing member (8) is disposed between the opening portion (220) of the filling apparatus side member (20) and the space (243) of the extension portion (24). And, in the protruding portion (12) of the nozzle side member (10) is preferably formed the flow path (R10) of the nozzle side member (10). In addition, no valve body is preferably arranged in the flow path (R20) of the filling apparatus side member (20). Further, a sealing material (for example, O-ring 7) is preferably arranged at the opening portion (220) of the filling apparatus side member (20) to seal the boundary with the protruding portion (12) of the nozzle side member or the closing member 8.

A safety joint (100A) according to the second invention of the present application includes: a cylindrical nozzle side member (plug 10A) with a flow path (plug side flow path R10A) formed inside, a shutoff valve (plug side shutoff valve V10) of the nozzle side member (10A) opens when the nozzle side member (10A) is connected to a filling apparatus side member (socket 20A); and the cylindrical filling apparatus side member (20A) with a flow path (socket side flow path R20A) formed inside, a shutoff valve (socket side shutoff valve V20) of the filling apparatus side member (20A) opens when the filling apparatus side member (20A) is connected to the nozzle side member (10A); and when the nozzle side member (10A) is disconnected from the filling apparatus side member (20A), the shutoff valves (10A, 20A) of the nozzle side member (10A) and the filling apparatus side member (20A) close, the safety joint (100A) (for emergency releasing) is characterized in that: central axes of the flow paths (R10A, R20A) of the nozzle side member (10A) and the filling apparatus side member (20A) are arranged orthogonally; the nozzle side member (10A) has a protruding portion (plug side protruding portion 12) with a diameter smaller than a region in which a valve body (plug side valve body 3) is housed, and the protruding portion (12) is formed with a through hole (12T) that communicates the flow path of the nozzle side member (10A) and the flow path of the filling apparatus side member (20A); the filling apparatus side member (20A) has an opening portion (through hole 220) into which the protruding portion (12) of the nozzle side member is inserted, the opening portion (through hole 220) extending in a direction orthogonal to the flow path (in-socket flow path R20A) of the filling apparatus side member; in a flow path (Fa1) of the filling apparatus side member are mounted a support member (60) that supports the valve body (30) of the shutoff valve (V20) on the filling apparatus side so as to be separated from a valve seat (V20) and an elastic body (socket side spring 40) that presses the valve body (30) toward the opening portion (220) side when the nozzle side member (10A) is connected to the filling apparatus side member (20A); the safety joint (100A) further incudes: a rod (81A) that can be inserted into the opening portion (220) of the filling apparatus side member (20A) and can be brought into contact with a tip of the protruding portion (12) of the nozzle side member (10A); a disk-shaped member (82A) fixed to the rod (81A); an elastic member (9) for urging the rod (81A) and the disk-shaped member (82A) in a direction that the nozzle side member (10A) comes off, and an outer diameter of the disk-shaped member (82A) is larger than an inner diameter of the opening portion (220) of the filling apparatus side member (20A); and the safety joint (100A) further incudes a closing member holding mechanism that holds the disk-shaped member (82A) and the rod (81A) at a position separated from the nozzle side member (10A) when the nozzle side member (10A) and the filling apparatus side member (20A) are connected.

In the second invention, it is preferable that the safety joint (100A) further includes an extension portion (24) having a space (243) in which the opening portion (220) is extended in an opposite direction of the nozzle side member (10A), and the rod (81A) is movable between the space (243) of the extension portion (24) and the opening portion (220) of the filling apparatus side member, and the disk-shaped member (82A) moves in the space (243) of the extension portion (24) only.

In the first and second inventions, it is preferable that the closing member holding mechanism includes a long member (13) and a rotation locking member (13L); the long member (13) extends parallel to the opening portion (220) of the filling apparatus side member (20, 20A), an end of the long member (13) is attached (fixed) to an area (14) where the valve body (plug side valve body 3) of the nozzle side member is housed, another end (13L) of the long member (13) extends to a vicinity of an end (82, 82A), of the closing member (8, 8A), separated from the nozzle side member (10, 10A), the other end (13L) is arranged at a position where the nozzle side member (10, 10A) is locked to the rotation locking member (31) when the nozzle side member (10, 10A) is connected to the filling apparatus side member (20, 20A), and thereby provides a function of transmitting disengagement movement of the nozzle side member (10, 10A) to the rotation locking member (31) via the other end (13L) when the nozzle side member (10, 10A) is disengaged from the filling apparatus side member (20, 20A); and the rotation locking member (31) is pivotally and rotatably supported, when the nozzle side member (10, 10A) is connected to the filling apparatus side member (20, 20A), an end (31a) engages with an end of the closing member (8, 8A) in such a manner as to prevent the nozzle side member (10, 10A) from coming off the filling apparatus side member (20, 20A), another end (31b) engages with the other end (13L) of the long member (13), when the nozzle side member (10, 10A) comes off from the filling apparatus side member (20, 20A), movement of the nozzle side member is transmitted through the long member (13) and the other end (13L) to the rotation locking member (31) and the rotation locking member (31) rotates, and the engagement between the end (31a) and the closing member (8, 8A) is released.

A safety joint (100B) according to the third invention of the present application includes: a cylindrical nozzle side member (plug 10B) with a flow path (in-plug flow path R10B) formed inside, a shutoff valve (plug side shutoff valve V10) opens when the nozzle side member (10B) is connected to a filling apparatus side member (socket 20B); and the cylindrical filling apparatus side member (20B) with a flow path (in-socket flow path R20B) formed inside, a shutoff valve (socket side shutoff valve V20) opens when the filling apparatus side member (20B) is connected to the nozzle side member (10B); and when the nozzle side member (10B) is disconnected from the filling apparatus side member (20B), the shutoff valves (V10, V20) of the nozzle side member (10B) and the filling apparatus side member (20B) close, the safety joint (100B) (for emergency releasing) is characterized in that: central axes of the flow paths (R10B, R20B) of the nozzle side member (10B) and the filling apparatus side member (20B) are arranged orthogonally; the nozzle side member (10B) has a protruding portion (plug side protruding portion 12) having a diameter smaller than a region in which a valve body (plug side valve body 3) is housed, and the protruding portion (12) is formed with a through hole (12T) that communicates the flow path (R10B) of the nozzle side member (10B) and the flow path (R20B) of the filling apparatus side member (20B); the filling apparatus side member (20B) has an opening portion (through hole 220), into which the protruding portion (12) of the nozzle side member is inserted, extending in a direction orthogonal to the flow path (R20B) of the filling apparatus side member (20B), and an extension portion (24B) having a space (243B) in which the opening portion (220) is extended in the opposite direction of the nozzle side member (10B) is provided; in the flow path (R20B) of the filling apparatus side member (20B) are mounted a support member (60) that supports the valve body (30) of the shutoff valve (V20) on the filling apparatus side so as to be separated from the valve seat (V20) and an elastic body (socket side spring 40) that presses the valve body (30) toward the opening portion (220) side when the nozzle side member (10B) is connected to the filling apparatus side member (20B); the safety joint (100B) further incudes an opening portion closing member (8B) that can slide in a space (243B) of the extension portion (24B) and the opening portion (220) of the filling apparatus side member (20B), and an elastic member (9B) that urges the opening portion closing member (8B) in a direction that the nozzle side member (10B) comes off; and the safety joint (100B) further incudes a decompression mechanism for reducing a pressure at the opening portion (220) of the filling apparatus side member.

In the third invention, it is preferable that the safety joint (100B) further includes an extension portion (24B) having a space (243B) in which the opening portion (220) is extended in an opposite direction of the nozzle side member (10B), and the closing member (8B) is movable between the space (243B) of the extension portion (24B) and the opening portion (220) of the filling apparatus side member. Further, in the third invention, it is preferable that the decompression mechanism has a small hole (84) formed in the opening portion closing member (8B) and a decompression through hole (246) provided at an end of the extension portion (24B) on a side separated from the nozzle side member (10B). In addition, the decompression through hole (246) is preferably in communication with a pressure valve (not shown).

In the second and third inventions, a sealing material (for example, O-ring 7) for sealing the boundary with the protruding portion (12) of the nozzle side member (10B) is preferably arranged at the opening portion (220) of the filling apparatus side member (20B).

According to the safety joint of the first invention of the present application with the above-mentioned configuration, although the opening portion (through hole 220) into which the protruding portion (12) of the nozzle side member (10) is inserted is formed in the filling apparatus side member (20) so as to extend in a direction orthogonal to the flow path (in-socket flow path R20) of the filling apparatus side member (20), and the closing member (8) slidable in the opening portion (220) and the elastic member (socket side spring 9) that urges the closing member (8) in the direction in which the nozzle side member (10) is disengaged are provided, when the nozzle side member (10) and the filling apparatus side member (20) are connected, the closing member (8) is held at a position separated from the nozzle side member (10) by the closing member holding mechanism. Thereby, when the nozzle side member (10) and the filling apparatus side member (20) are connected, the closing member holding mechanism does not block the flow path of the filling apparatus side member (20), and hydrogen supplied from the hydrogen filling apparatus is filled into a tank in a fuel cell vehicle with a hydrogen filling nozzle though the hydrogen supply port (25) of the filling apparatus side member (20), the flow path (R20) of the filling apparatus side member, the through hole (12T) formed in the protruding portion (12) of the nozzle side member (10), the flow path (R10) of the nozzle side member (10), and the hydrogen outlet of the nozzle side member. If the nozzle side member (10) is pulled out from the filling apparatus side member (20) due to some trouble, at the initial stage of the pulling out, the closing member holding mechanism will not hold the closing member (8) at a position separated from the nozzle side member (10). Since the elastic member (spring 9) urges the closing member (8), the closing member (8) moves together with the protruding portion (12) of the nozzle side member (10) in a direction in which the nozzle side member (10) comes off. As a result, even if the closing member (8) is removed, the socket side flow path (R20) is blocked by either the protruding portion (12) of the nozzle side member (10) or the closing member (8), and the socket side flow path (R20) is closed, so that the hydrogen gas remaining in the socket side flow path (R10) does not flow out to the outside of the safety joint (100). Then, when the nozzle side member (10) is separated from the filling apparatus side member (20), the flow rate of the high-pressure gas discharged as outgas from the safety joint (100) is extremely reduced.

According to the safety joint (100A) of the second invention of the present application with the above-mentioned configuration, the support member (60) and the elastic body (socket side spring 40) that presses the valve body (30) to the opening portion (243) side are provided in the flow path (R20A) of the filling apparatus side member (20A), the rod (81A) that can be inserted into the opening portion (220) of the filling apparatus side member (20A) and is capable of contacting the tip of the protruding portion (12) of the nozzle side member (10A), the disk-shaped member (82A) fixed to the rod (81A), and the elastic member (9) that urges the rod (81A) and the disk-shaped member (82A) in the direction that the nozzle-side member (10A) is disengaged are provided, and the outer diameter of the disk-shaped member (82A) is larger than the inner diameter of the opening portion (220) of the filling apparatus side member (20A), and the closing member holding mechanism that holds the disk-shaped member (82A) and the rod (81A) at a position separated from the nozzle side member (10A) when the nozzle side member (10A) and the filling apparatus side member (20A) are connected is mounted. Thereby, when the nozzle side member (10A) and the filling apparatus side member (20A) are connected, the shutoff valve (V20) of the filling apparatus side member (20A) is held in an open state by the support member (60), and the hydrogen supplied from the hydrogen filling apparatus is filled in a tank inside a fuel cell vehicle with a hydrogen filling nozzle through the hydrogen supply port (25) of the filling apparatus side member (20A), the flow path (R20A) of the filling apparatus side member (20A), the through hole (12T) formed in the protruding portion (12) of the nozzle side member (10A), the flow path (R10A) of the nozzle side member (10A), and the hydrogen outlet (5) of the nozzle side member (10A).

In the second invention, when the nozzle side member (10A) is ejected from the filling apparatus side member (20A), at the initial stage of the ejection, the position of the through hole (12T) formed on the protruding portion (12) of the nozzle side member (10A) does not match the position of the flow path of the filling apparatus side member (20A), thereby the protruding portion (12) of the nozzle side member (10A) closes the flow path (R20A) of the filling apparatus side member (20A). Further, when the nozzle side member (10A) comes out of the filling apparatus side member (20A), the closing member holding mechanism does not hold the disk-shaped member (82A) and the rod (81A) at positions separated from the nozzle side member (10A), so that the disk-shaped member (82A) is pressed against the opening portion (220) of the filling apparatus side member (20A) by the elastic member (9). Here, since the outer diameter of the disc-shaped member (82A) is larger than the inner diameter of the opening portion (220), when the disc-shaped member (82A) is caused to be pressed against the opening portion (220) of the filling apparatus side member by the elastic member (9), the opening portion (220) of the filling apparatus side member (20A) is closed. Further, the support member (60) does not hold the shutoff valve (V20) of the filling apparatus side member (20A) in an open state, and the shutoff valve (V20) of the filling apparatus side member (20A) is closed, thereby the hydrogen gas from the filling apparatus side is completely shut off by the shutoff valve (V20) of the filling apparatus side member (20A).

According to the safety joint (100B) of the third invention of the present application with the above-mentioned configuration, the nozzle side member (10B) has a protrusion (plug side protrusion 12) with a diameter smaller than the region in which the valve body (plug side valve body 3) is accommodated, the protrusion (12) has a through hole (12T) for communicating the flow path (R10B) of the nozzle side member (10B) and the flow path (R20B) of the filling apparatus side member (20B) is formed in the protrusion (12), and the opening portion (through hole 220) into which the protrusion (12) of the nozzle side member (10B) is inserted is formed so as to extend in a direction orthogonal to the flow path (R20B) of the filling apparatus side member (20B) is formed in the filling apparatus side member (20B), the extension portion (24B) with the space (243B) in which the opening portion (220) is extended in the opposite direction of the nozzle side member (10B) is provided, in the flow path of the filling apparatus side member (20B), a support member (60) that supports the valve body (30) of the shutoff valve on the filling apparatus side (20B) so as to be separated from the valve seat (V20) when the nozzle side member (10B) is connected to the filling apparatus side member (20B), and the elastic body (socket side spring 40) that presses the valve body (30) toward the opening portion (220) side are provided, the opening portion closing member (8B) slidable in the space (243B) of the extension portion (20B) and the opening portion (220) of the filling apparatus side member (20B), and the elastic member (9B) urging the opening portion closing member (8B) in the direction that the nozzle side member (10B) is disconnected are provided, and the depressurizing mechanism for reducing the pressure at the opening portion (220) of the filling apparatus side member (20B) is provided. With this, according to the present invention, when the nozzle side member (10B) and the filling apparatus side member (20B) are connected, the support member (60) supports the shutoff valve (30) of the filling apparatus side member (20B) in open state, which allows the hydrogen supplied from the filling apparatus to be filled in a tank in a fuel cell vehicle with a hydrogen filling nozzle through the hydrogen supply port (25) of the filling apparatus side member (20B), the flow path (R20B) of the filling apparatus side member (20B), the through hole (12T) formed in the protruding portion (12) of the nozzle side member (10B), the flow path (R10B) of the nozzle side member (10B), and the hydrogen outlet (5) of the nozzle side member (10B).

In the third invention, when the nozzle side member (10B) is ejected from the filling apparatus side member (20B), at the initial stage of the ejection, since the position of the through hole (12T) formed on the protruding portion (12) of the nozzle side member (10B) does not match the position of the flow path of the filling apparatus side member (20B), the protruding portion (12) of the nozzle side member (10B) closes the flow path (R20B) of the filling apparatus side member (20B). At that time, even if gas leaks from the boundary between the protrusion (12) of the nozzle side member (10B) and the opening portion (220) of the filling apparatus side member (20B), the decompression mechanism causes the gas to be discharged outside of the safety joint (100B), which prevents the danger associated with the high pressure of the leaked gas. Then, when the protruding portion (12) of the nozzle side member (10B) comes off from the filling apparatus side member (20B), the support member (60) moves to the opening portion (220) side due to the elastic repulsive force of the elastic body (socket side spring 40) pressing the valve body (30) toward the opening portion (220) side, and the shutoff valve (V20) of the filling apparatus side member (20B) is immediately closed from the open state. Therefore, the hydrogen gas from the filling apparatus side (20B) is completely shut off by the shutoff valve (V20) of the filling apparatus side member (20B).

DETAILED DESCRIPTION

Figure 1:
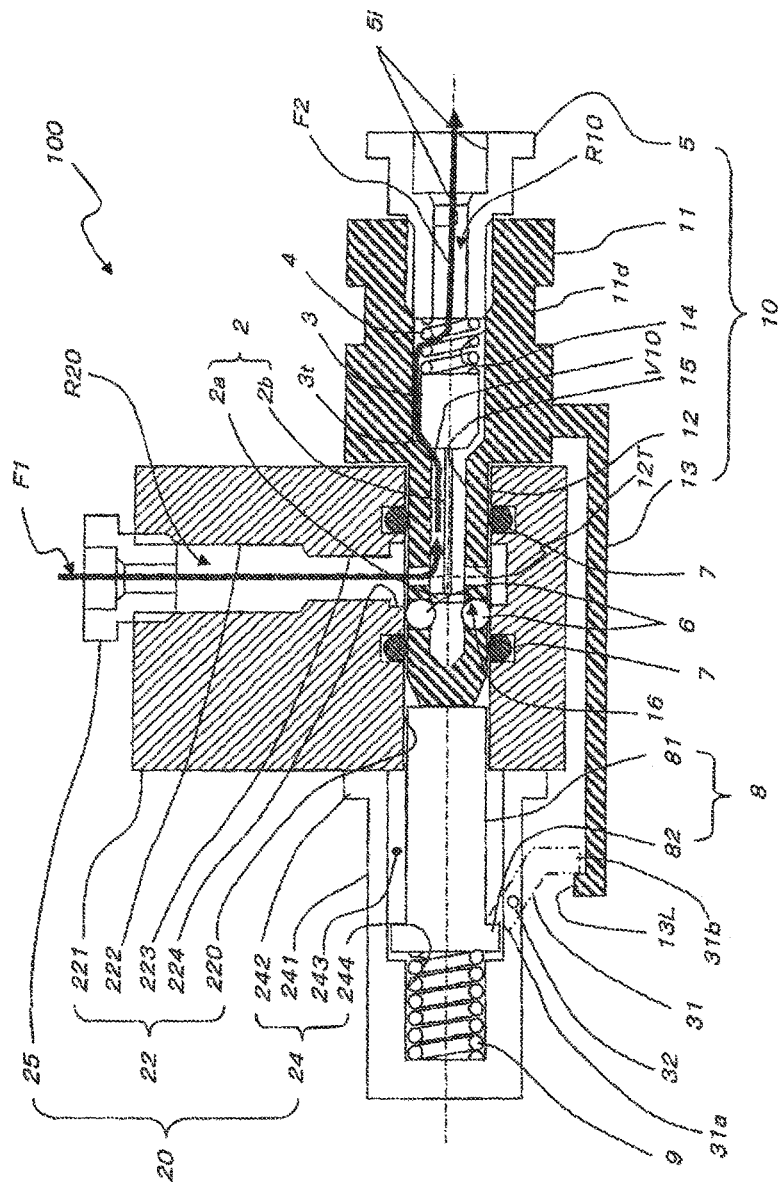
FIG. 1 is an explanatory cross-sectional view showing a safety joint according to the first embodiment of the present invention in a state where a protruding portion of a nozzle side member (plug) is connected to a filling apparatus side member (socket).

Hereinafter, embodiments of the present invention will be described with reference to the attached drawings. First, the first embodiment will be described with reference to FIGS. 1 and 2. In FIG. 1, the safety joint of the first embodiment, entirely indicated by a reference numeral 100, includes a nozzle side member (plug) 10 and a filling apparatus side member (socket) 20.

The plug 10 has a plug body 11 and a plug protruding portion 12 integrally formed with the plug body 11. The plug body 11 is, for example, a columnar shape, and a constricted portion 11d having a small diameter is formed in a roughly central portion thereof. For example, the plug protruding portion 12 is formed in a columnar shape with a diameter smaller than that of the plug body 11, and the end portion on the side separated from the plug body 11 (left side in FIGS. 1 and 2) is chamfered.

A second flow path 14 is formed in the plug body 11, the end portion of the second flow path 14 separated from the socket (right side in FIGS. 1 and 2) is open, an attachment 5 constituting a gas outlet is screwed into the opening portion. A first flow path 15 with an inner diameter smaller than that of the second flow path 14 is formed in a central portion of the plug protruding portion 12, the first flow path 15 and the second flow path 14 are connected through a tapered portion (no reference numeral), a plug side shutoff valve V10 is configured by the tapered portion that is the connection point between the first flow path 15 and the second flow path 14 and a tapered portion 3t of a plug side valve body 3.

The plug side valve body 3 with the tapered portion 3t processed at the left end is housed in the second flow path 14, and a coil spring 4 for urging the plug side valve body 3 to the socket side (left side in FIGS. 1 and 2) is accommodated between the plug side valve body 3 and the attachment 5. A through hole 16 orthogonal to the first flow path 15 is formed in the vicinity of the tip (left end) of the first flow path 15, and steel balls 6 (bearing balls: 2 pieces in FIGS. 1 and 2) are inserted in the through hole 16. A second through hole 12T is formed in the region on the plug body 11 side (the region on the right side in FIGS. 1 and 2) with respect to the through hole 16. In the state of FIG. 1, the second through hole 12T is aligned with the extension of the center line of a flow path R20 of the socket 20.

In FIG. 1, a piston 2 is housed in the first flow path 15, the piston 2 has a disk member 2a and a rod-shaped member 2b, and the disk member 2a is provided at the end of the rod-shaped member 2b on the side separated from the plug body 11 (left side in FIG. 1). The outer diameter of the disk member 2a is set such that the disk member 2a reliably presses the balls 6 in FIG. 1 and slides smoothly in the first flow path 15 without play.

Here, in the state shown in FIG. 1, the plug side valve body 3 is urged to the left side in FIG. 1 by the coil spring 4, and the piston 2 in contact with the left end surface of the plug side valve body 3 is also urged to the left side. As a result, the disk member 2a of the piston 2 contacts with the balls 6 and cannot move to the region on the side (left side in FIG. 1) of the balls 6 separated from the body 11 on the plug side. In other words, the disk member 2a of the piston 2 cannot move, by the balls 6, in a direction (left side) that the spring 4 extends.

The socket 20 has a socket body 22 and an extension portion 24 of the socket body 22. In the socket body 22, in the lower region (the region on the side where the plug protruding portion 12 is inserted) in FIG. 1, is formed an opening portion 220 (through hole) in the left-right direction (horizontal direction) in FIG. 1. Then, the in-socket flow path R20 extending in the vertical direction of the socket body 22 in FIG. 1 is formed, and an opening portion is formed at an end of the in-socket flow path R20 on the side separated from the plug protruding portion 12 (upper side in FIG. 1). The in-socket flow path R20 has a first flow path 222 in the upper region (the region on the opening portion side) in FIG. 1 and a second flow path 223 that is continued to the first flow path 222 via a tapered portion and has an inner diameter smaller than that of the first flow path 222. Unlike the above-mentioned prior art (Patent Document 1) and the second and third embodiments described later, the in-socket flow path R20 in the socket 20 of the first embodiment is not provided with a valve body.

Immediately below the second flow path 223 (on the plug protruding portion 12 side) of the through hole 220, a cylindrical space 224 that is concentric with the through hole 220 and has an inner diameter larger than that of the through hole 220 is formed. In other words, the cylindrical space 224 communicating with the second flow path 223 is orthogonal to the second flow path 223. An attachment 25 constituting a gas inflow port is screwed into the opening portion at the upper end of the in-socket flow path R20. O-rings 7 are provided in the left and right regions of the in-socket flow path R20 in the through hole 220.

The extension portion 24 provided on the side of the socket body 22 separated from the plug 10 (left side in the drawing) has a cylindrical portion 241 and a flange 242, and is connected to a socket body 221 with the flange 242. A cylindrical space 243 and a spring accommodating hole 244 are formed in the cylindrical portion 241, the cylindrical space 243 has an opening portion on the flange 242 side (left side in the figure) and has a function of sliding a closing member 8 in the cylindrical space 243, and the spring accommodating hole 244 communicates with the cylindrical space 243 and has an inner diameter smaller than that of the cylindrical space 243. A spring 9 is accommodated in the spring accommodating hole 244, and the spring 9 urges the closing member 8 to the plug 10 side (right side in the figure).

The closing member 8 has a function of smoothly sliding in the cylindrical space 243, and has a columnar portion 81 and a flange portion 82 with a larger outer diameter than the columnar portion 81. The plug 10 side (right side in the drawing) of the cylindrical portion 81 is inserted into the through hole 220 formed in the socket body 22, and slides in the through hole 220.

The socket 20 is provided with a closing member holding mechanism 31 (lever), and the lever 31 has a function of holding the closing member 8 at a position separated from the plug 10 when the plug 10 and the socket 20 are connected (in the case of FIG. 1). The lever 31 is rotatable around a hinge pin 32 provided in the cylindrical portion 241 of the socket 20, and is formed in a substantially "dogleg" shape.

On the other hand, a retention release rod 13 is provided on the plug body 11, and the retention release rod 13 is attached in the vicinity of the plug protruding portion 12 and extends in the longitudinal direction of the plug protruding portion 12 in a direction away from the plug body 11. A rod tip 13L of the retention release rod 13 is bent in an L shape, and the tip faces the lever 31 side (upper side of FIG. 1). The inner side of an end 31b of the lever 31 (the left side in FIG. 1) is engaged with the inner side of the rod tip 13L (the right side in FIG. 1). Then, in the state of FIG. 1, the other end 31a of the lever 31 is engaged with the surface of the flange portion 82 of the closing member 8 on the plug 10 side (the surface on the right side in FIG. 1). Engaging the flange portion 82 of the closing member 8, the lever 31, and the retention release rod 13 as described above maintains the connection between the plug 10 and the socket 20.

Figure 8:
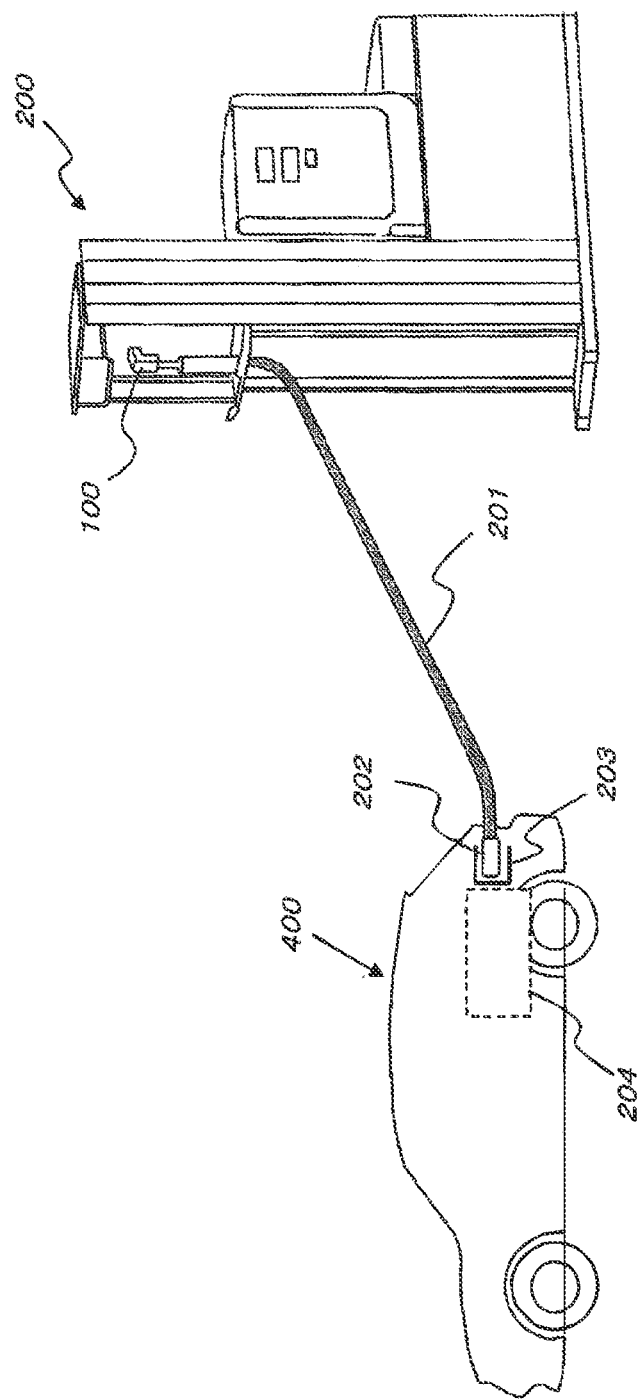
FIG. 8 is a block diagram showing an outline of a hydrogen filling facility.
Figure 9:
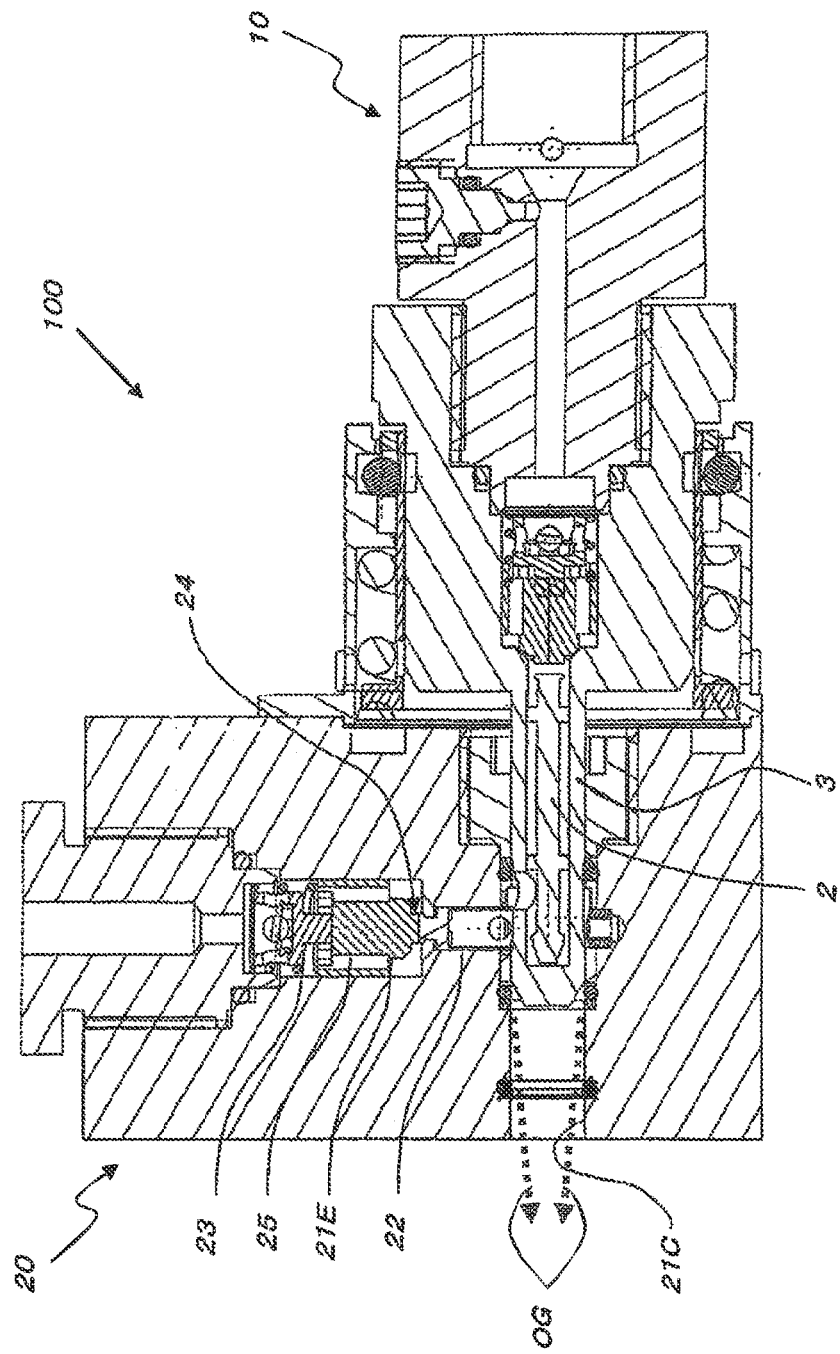
FIG. 9 is a cross sectional view showing an initial stage of the process that a plug is pulled out from a socket in a prior art.

The flow of hydrogen gas in the state shown in FIG. 1 (the state in which the plug 10 is connected to the socket 20) will be described with reference to FIG. 1. At the time of hydrogen filling, the hydrogen gas supplied from the hydrogen filling apparatus 200 (see FIG. 8) via the attachment 25 side (hydrogen inflow port) passes, as indicated with the arrow F1, through the in-socket flow path R20 of the socket body 22 and flows into the first flow path 15 formed in the plug protruding portion 12 via the second through hole 12T. Here, since the O-rings 7 are provided on the left and right sides of the in-socket flow path R20 in the through hole 220, hydrogen is prevented from leaking from the boundary portion between the plug protruding portion 12 and the through hole 220. As described above, in the state of FIG. 1, the disk member 2a in the piston 2 of the plug 10 cannot be moved by the balls 6 in the extension direction (left side) of the spring 4, and the plug side shutoff valve V10 keeps open state shown in FIG. 1. As a result, as shown with the arrow F2, the hydrogen gas that has flowed into the first flow path 15 of the plug protruding portion 12 flows in the filling hose 201 (see FIG. 8) via the plug side shutoff valve V10, the flow path 14 of the plug 10, and a flow path 5i (gas outlet) of the attachment 5. The reference numeral R10 in FIG. 1 indicates an in-plug flow path.

Figure 2:
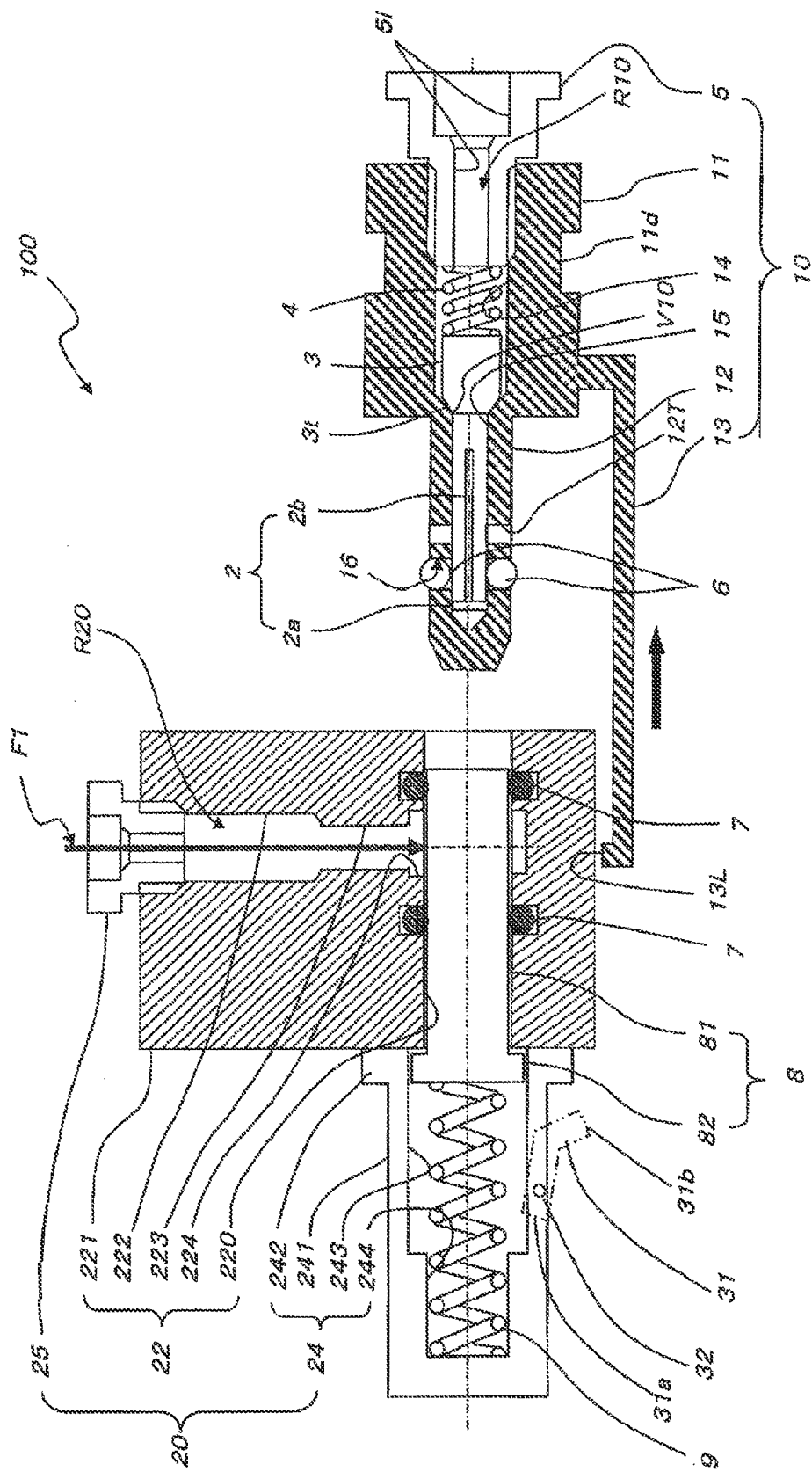
FIG. 2 is an explanatory cross-sectional view showing a state in which the protruding portion of the nozzle side member is disconnected from the filling apparatus side member in the first embodiment.

Next, the case where the plug 10 is disconnected from the socket 20 will be described with reference to FIG. 2 also. In the state shown in FIG. 1, when the plug 10 is disengaged from the socket 20, the tip 13L of the retention release rod 13 provided on the plug 10 moves in the direction that the plug 10 is disengaged (right side of FIGS. 1 and 2). In FIG. 1, when the tip 13L of the retention release rod 13 moves to the right side of FIG. 2, the lever 31 on the socket 20 side rotates counterclockwise, and the engagement between the flange portion 82 of the closing member 8 and the lever 31 is released. When the engagement between the flange portion 82 and the lever 31 is released, as shown in FIG. 2, the closing member 8 that has been in contact with the tip of the plug protruding portion 12 is urged by the coil spring 9 to move to the plug 10 side (to the right side in FIG. 2), and is in the condition shown in FIG. 2. Moving the closing member 8 to the plug 10 side (to the right side in FIG. 2) causes the closing member 8 to be located near the in-socket flow path R20 of the through hole 220 as shown in FIG. 2 to close the socket inner flow path R20 and block the flows of hydrogen gas indicated with the arrows F1 and F2 in FIG. 1.

When the plug 10 is disengaged from the socket 20, the plug protruding portion 12 moves from the state of FIG. 1 in the direction that the plug is disengaged (right side in FIGS. 1 and 2), and the balls 6 reach the cylindrical space 224. An elastic repulsive force due to the extension of the spring 4 acts on the balls 6, and the elastic repulsive force causes the balls 6 to constantly try to move outward in the radial direction of the plug protruding portion 12. With this, the ball that has reached the cylindrical space 224 moves outward in the radial direction of the plug protruding portion 12 and enters the cylindrical space 224, and the state in which the disk member 2a of the piston 2 is in contact with the balls 6 is released. Then, the disk member 2a of the piston 2 moves beyond the balls 6 in the extension direction of the spring 4 (left side in FIGS. 1 and 2). As a result, due to the elastic repulsive force of the spring 4, the plug side valve body 3 sits on the tapered portion (valve seat) which is the connection point of the second flow path 14, and as shown in FIG. 2, the plug side valve body V10 is closed, which prevents high-pressure hydrogen gas from flowing out of the plug 10 side.

According to the first embodiment shown in FIGS. 1 and 2, when the plug 10 is disengaged from the socket 20 due to an abnormal start of a vehicle or the like, the retention release rod 13 provided on the plug 10 goes to the right; the lever 31 on the socket 20 side engaged with the tip 13L of the retention release rod 13 rotates counterclockwise; the engagement between the closing member 8 and the lever 31 is disengaged, and the spring 9 urges the closing member 8d so as to instantly rush into the through hole 220, so that it is possible to block the in-socket flow path R20 and downstream of the flow path R20. Further, since the O-rings 7 are provided in the left and right regions of the in-socket flow path R20 in the through hole 220, the flow of hydrogen gas at the boundary between the closing member 8 and the inner wall surface of the through hole 220 is also sealed. With this, the leakage of a gas such as hydrogen gas (including out gas) can be prevented. In addition, the safety joint 100 of the first embodiment has the relatively small number of constituent members (the number of parts), and their shapes are also based on a column or a cylindrical space, so that machining for the parts is extremely easy, which provides an inexpensive safety joint.

Figure 3:
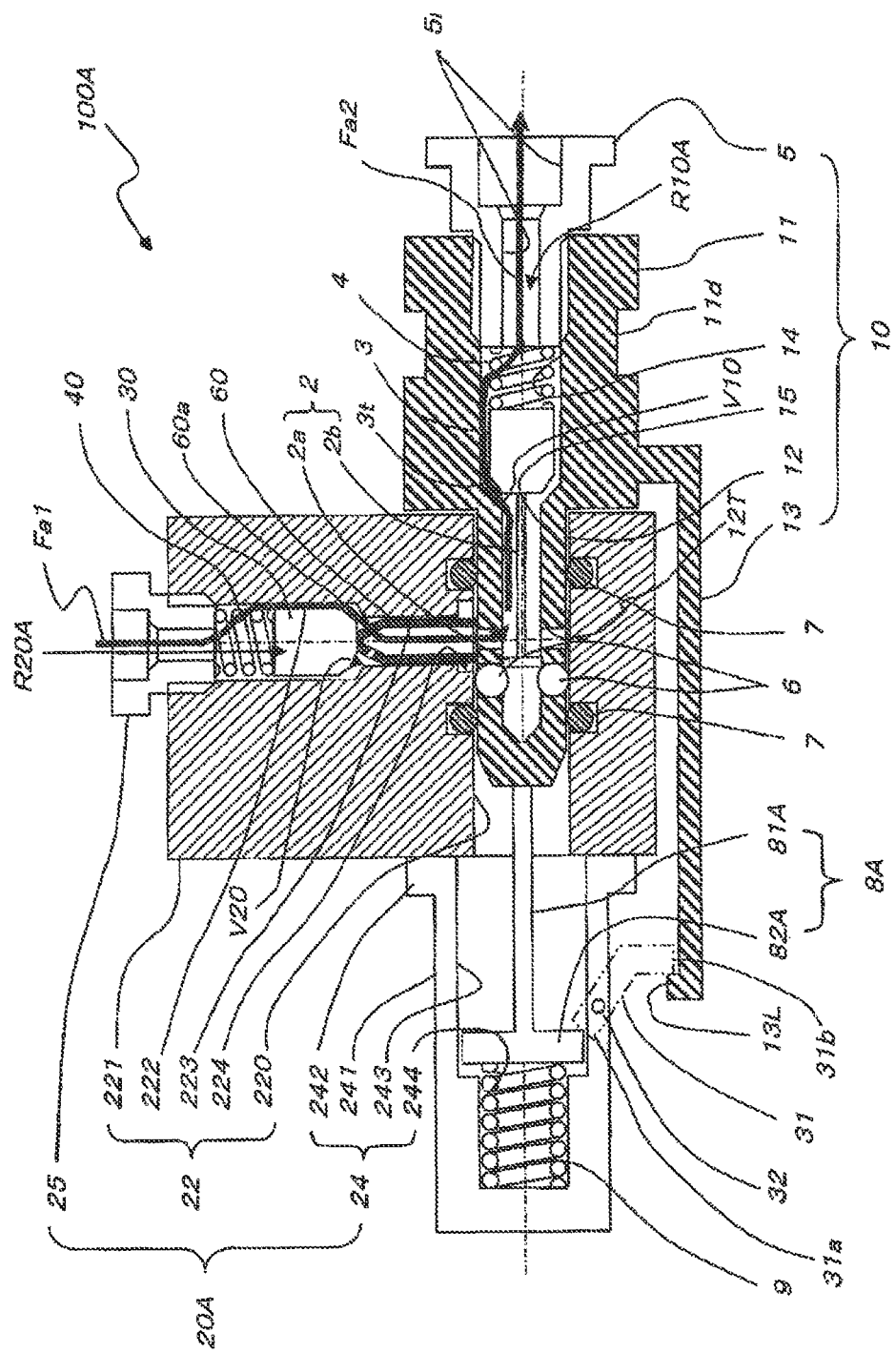
FIG. 3 is an explanatory cross-sectional view showing a safety joint according to the second embodiment of the present invention in a state where a protruding portion of a nozzle side member is connected to a filling apparatus side member.

Next, the second embodiment will be described with reference to FIGS. 3 and 4. In FIG. 3, in a safety joint 100A according to the second embodiment, a socket side valve body 30 and a coil spring 40 are arranged inside the first flow path 222 of the socket body 22 in a socket 20A, and the coil spring 40 is arranged between the socket side valve body 30 and the internal side end portion of the attachment 25. A support member 60 is arranged in the second flow path 223 below the socket side valve body 30, and a tip of the support member 60 (the tip on the valve body side: the upper end in FIG. 3) has a triangular pyramid shape and is an entirely cylindrical hollow member with an open bottom. The valve seat of the socket side shutoff valve V20 is composed of a tapered portion which is a connecting portion between the first flow path 222 and the second flow path 223. In the safety joint 100A according to the second embodiment shown in FIGS. 3 and 4, the same members as those of the first embodiment shown in FIGS. 1 and 2 are designated by the same reference numerals.

A plurality of small holes 60a are provided in the triangular pyramid portion of the support member 60, and the small holes 60a form a part of the gas flow path. In the state where the plug 10 is connected to the socket 20A, the open lower end of the support member 60 is in contact with the outer peripheral surface of the plug protruding portion 12, and the socket side valve body 30 is in contact with the upper end of the support member 60. As a result, in FIG. 1, the socket side valve body 30 is separated from the valve seat (the tapered portion connecting the first flow path 222 and the second flow path 223) by the support member 60, and the shutoff valve V20 is maintained in an open state. The plug 10 side is the same as that of the first embodiment of FIGS. 1 and 2. In FIG. 3, the reference numeral R10A indicates a flow path in the plug.

Figure 4:
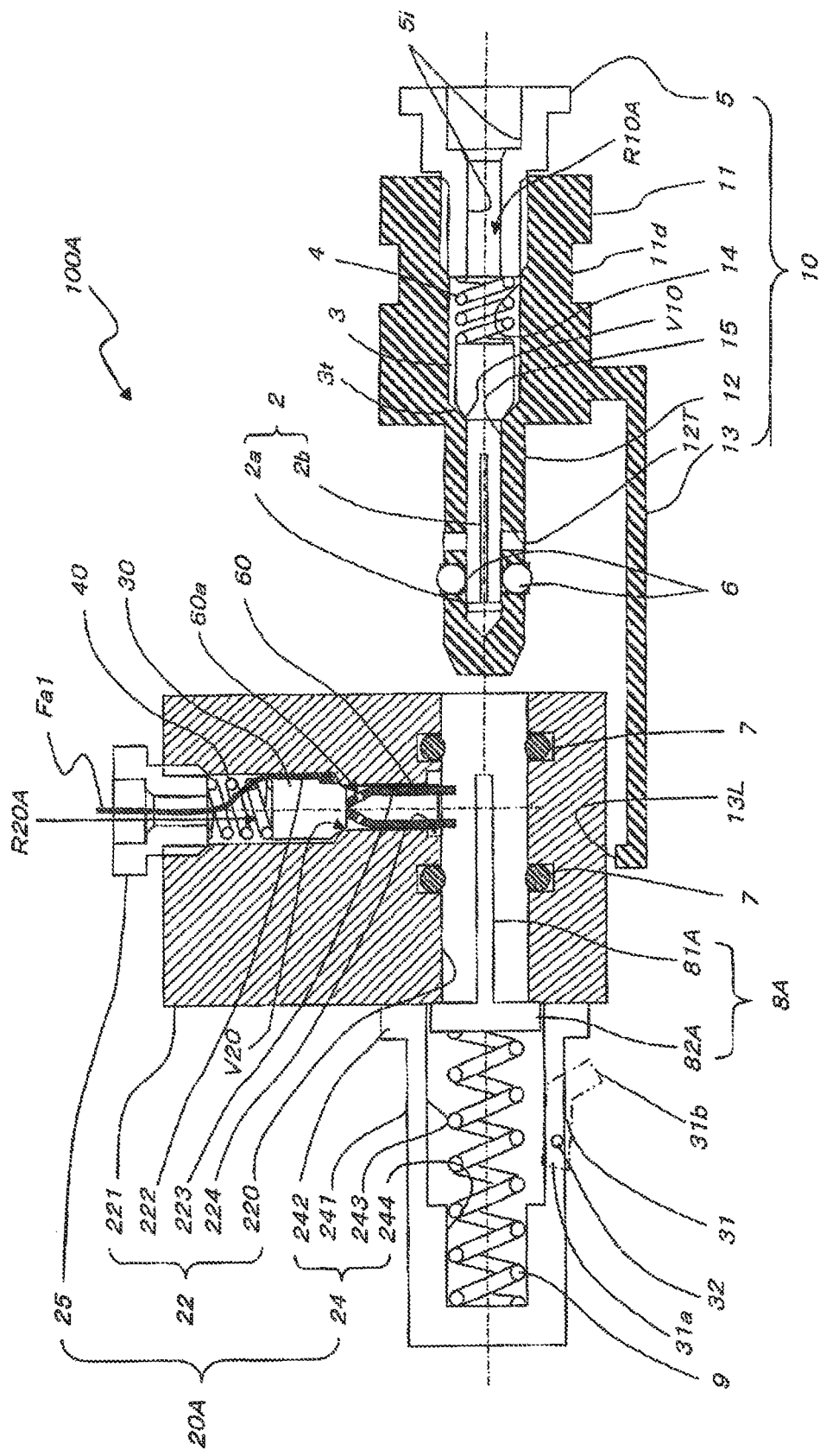
FIG. 4 is an explanatory cross-sectional view showing a state in which the protruding portion of the nozzle side member is disconnected from the filling apparatus side member in the second embodiment.

In the second embodiment of FIGS. 3 and 4, as in the first embodiment, the socket 20A is provided with the closing member holding mechanism 31 (lever), and the plug body 11 is provided with the retention release rod 13. However, the closing member 8A in the second embodiment shown in FIGS. 3 and 4 is different from the closing member of the first embodiment. The closing member 8A has a rod-shaped member 81A and a disk portion 82A. The rod-shaped member 81A extends in the through hole 220, and the disk portion 82A is urged to the plug 10A side (right side in the figure) with the spring 9. The spring 9 is housed in the spring housing hole 244 of the extension portion 24. In the state shown in FIG. 3 (the state in which the plug 10A is connected to the socket 20A), the rod tip 13L of the retention release rod 13 is engaged with an end 31b of the lever 31, and the other end 31a of the lever 31 is engaged with the disc portion 82A of the closing member 8. Similar to FIG. 1, the connection between the plug 10A and the socket 20A is maintained by engaging the lever 31, the retention release rod 13, and the disc portion 82A of the closing member 8.

A mode of filling the filling gas will be described with reference to FIG. 3. Hydrogen gas flowing from the attachment 25 (gas inlet) into the in-socket flow path R20A of the socket body 22 passes through the socket side shutoff valve V20 in open state and passes through the flow path R20A as shown by the arrow Fa1. Then, it flows into the first flow path 15 formed in the plug protruding portion 12 via the second through hole 12T formed in the plug protruding portion 12. In the in-socket flow path R20A, the gas that has passed through the first flow path 222 passes through the plurality of small holes 60a formed on the triangular pyramid portion of the support member 60 and the internal space of the support member 60.

Next, a case where the plug 10A is disconnected from the socket 20A will be described with reference to FIGS. 3 and 4. In FIG. 4, when the plug 10A is disengaged from the socket 20A (moves to the right side in FIG. 4), the tip 13L of the retention release rod 13 provided on the plug 10A also moves to the plug side (right side in FIG. 4); the lever 31 on the socket 20A side engaged with the retention release rod 13 rotates counterclockwise; the engagement between the closing member 8A and the lever 31 is released; and the closing member 8A moves to the plug 10A side (right side in FIG. 4) due to the elastic repulsive force of the coil spring 9. Then, the disk portion 82A of the closing member 8A urged by the coil spring 9 closes the opening portion at the end of the extension portion 24 (left side in FIG. 4) of the through hole 220. Here, since the rod-shaped member 81A of the closing member 8A has a smaller diameter than that of the plug protruding portion 12, the supporting member 60 supported by the plug protruding portion 12 is pressed toward the inside of the through hole 220 (lower in the drawing) due to the elastic repulsive force of the socket side spring 40. At the same time, the socket side valve body 30 is also pressed toward the through hole 220 side (lower in the drawing) due to the elastic repulsive force of the socket side spring 40, and sits on the valve seat to close the socket side shutoff valve V20. Other configurations and effects in the second embodiment shown in FIGS. 3 and 4 are the same as those of the first embodiment shown in FIGS. 1 and 2.

Next, the third embodiment of the present invention will be described with reference to FIGS. 5 to 7. The safety joint according to the third embodiment is entirely indicated by a reference numeral 100B. The safety joint according to the third embodiment does not include the retention release rod 13 and the lever 31 in the first and second embodiments shown in FIGS. 1 to 4, and does not include the closing members 8 and 8A. In the third embodiment, the extension portion 24B of the socket 20B and its internal configuration are different from those of the first embodiment and the second embodiment shown in FIGS. 1 to 4.

Figure 5:
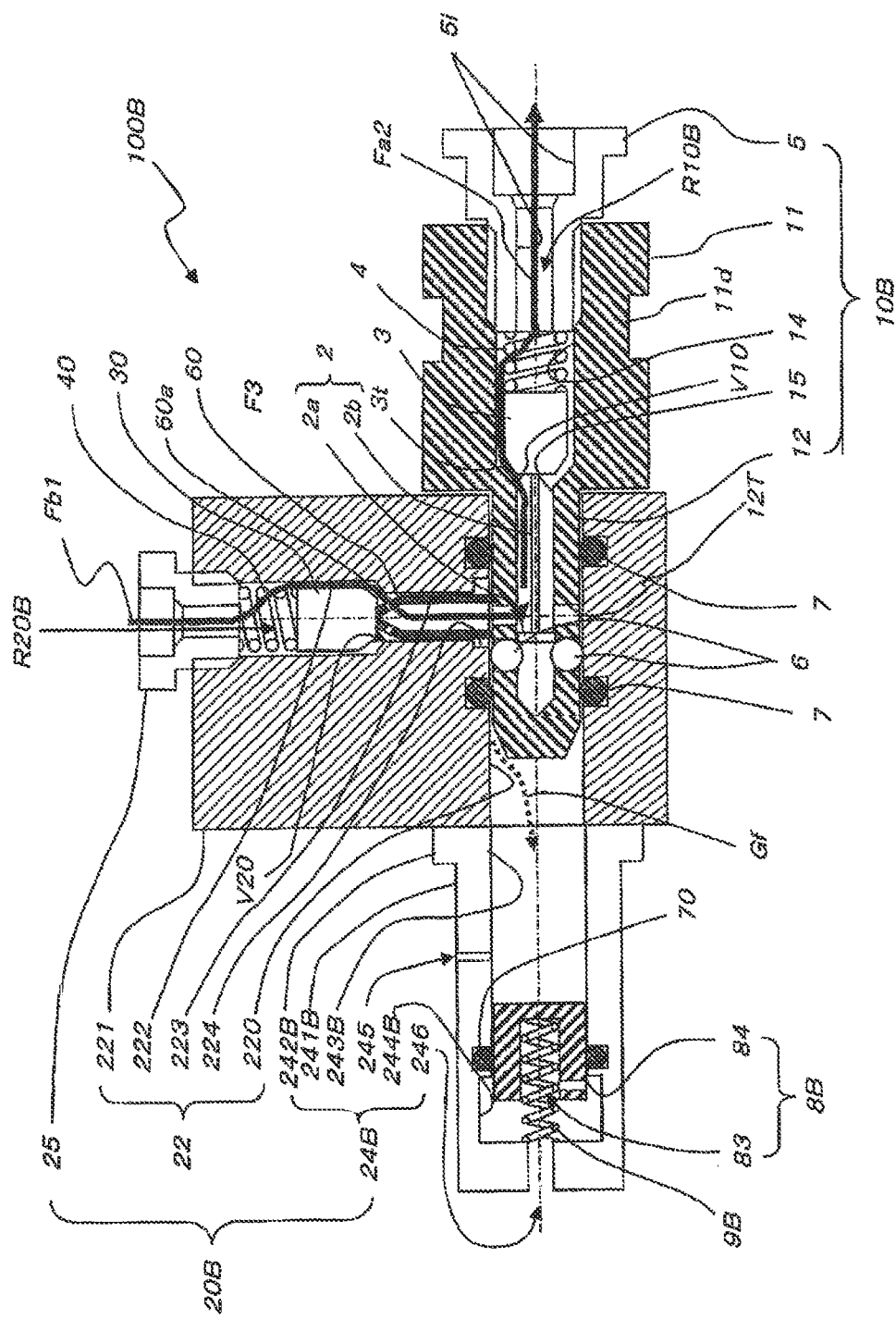
FIG. 5 is an explanatory cross-sectional view showing a safety joint according to the third embodiment of the present invention in a state where a protruding portion of a nozzle side member is connected to a filling apparatus side member.

In FIG. 5, which shows a state in which the plug 10B is connected to the socket 20B, the extension portion 24B of the socket 20B has a cylindrical shape with a step portion. The extension portion 24B forms a cylindrical space 243B in which the plug 10B side (right side in FIG. 5) is open. A slider 8B is housed in the cylindrical space 243B, and slides therein. In the illustrated example, the inner diameter of the cylindrical space 243B is equal to that of the through hole 220 formed in the socket body 22.

On the side of the cylindrical space 243B separated from the flange 242B side (left side in FIG. 5), a space 244B (chamber) having an inner diameter larger than that of the cylindrical space 243B is formed adjacent to the cylindrical space 243B. An exhaust port 246 is formed on the chamber 244B side end surface (left end surface in FIG. 5) of the extension portion 24B. The slider 8B has a cylindrical shape in which the plug 10B side (right side in FIG. 5) is closed and the end side on the side where the exhaust port 246 is formed (left side in FIG. 5) is open. A coil spring 9B is interposed in the internal space 83 of the slider 8B. A small exhaust hole 84 is formed in the vicinity of the open side end of the slider 8B. Although not explicitly shown in the figure, the exhaust port 246 can communicate with a pressure valve (not shown).

An O-ring groove (reference numeral is omitted) is formed in the vicinity of the step portion of the cylindrical space 243B with the chamber 244B, and an O-ring 70 is interposed inside the O-ring groove. Further, a small hole 245 for pressure release is formed in a substantially central portion of the cylindrical space 243B, and the small hole 84 for pressure release is formed in the slider 8B also. As will be described later, during hydrogen gas filling, hydrogen gas (filled gas) leaks from the boundary between the through hole 220 and the plug protruding portion 12, and the internal pressure of the cylindrical space 243B increases. The pressure in the cylindrical space 243B acts in a direction that separates the plug 10B from the socket 20B. Therefore, a small exhaust hole 84 and the exhaust port 246 are formed to prevent the plug 10B from being separated from the socket 20B due to the pressure increase in the cylindrical space 243B in normal use. The small hole 245 for pressure relief is also formed for the same purpose.

Figure 6:
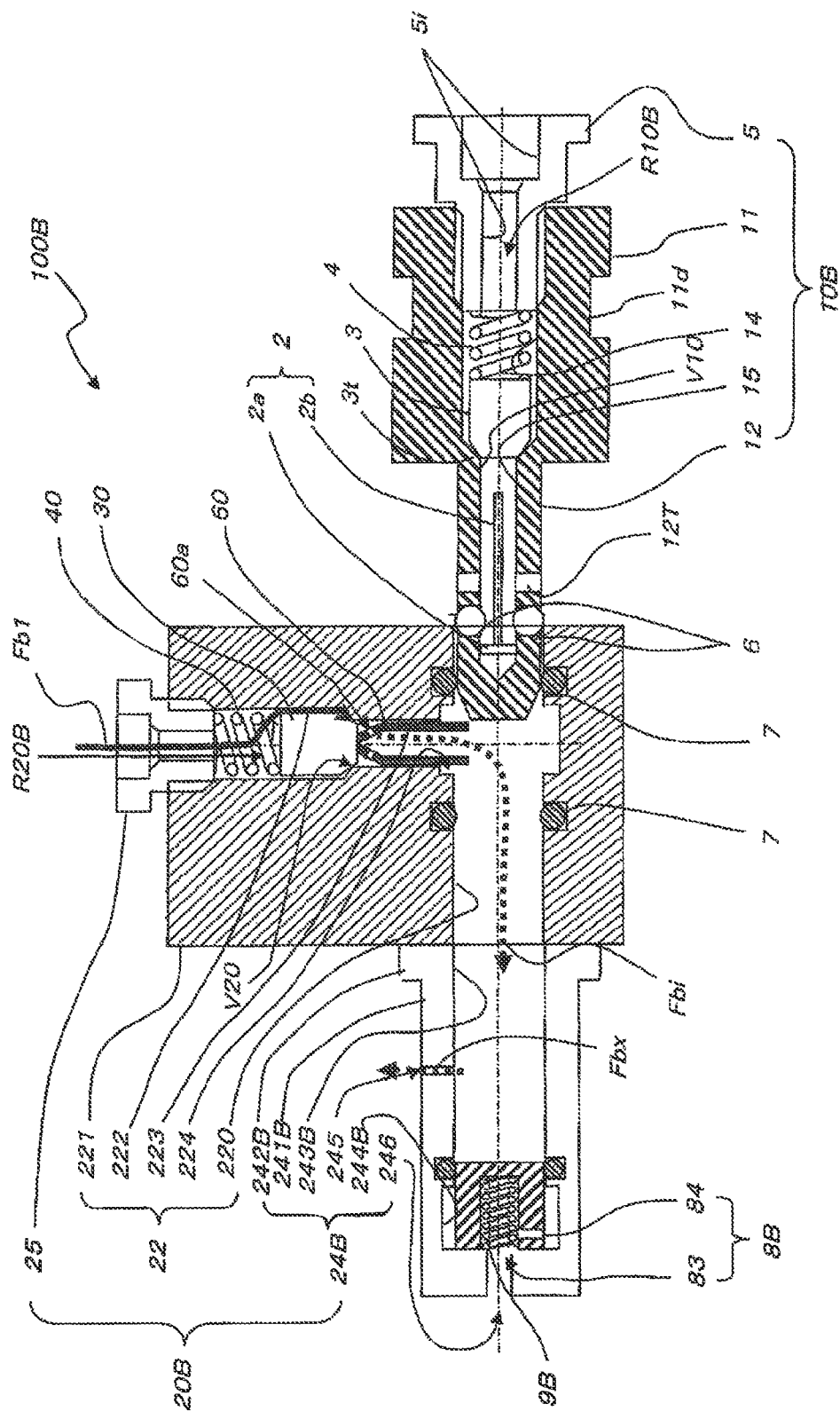
FIG. 6 is an explanatory cross-sectional view showing a state in which the protruding portion of the nozzle side member is being disengaged from the filling apparatus side member in the third embodiment.

The third embodiment shown in FIGS. 5 and 6 is substantially the same as the second embodiment shown in FIGS. 3 and 4 except for the configuration of the extension portion 24B and the absence of the retention release rod 13, the lever 31 and the closing member 8A. Therefore, in the third embodiment, the mode of filling the filling gas and the hydrogen gas flow path indicated by the arrows Fb1 and Fa2 are substantially the same as those of the second embodiment shown in FIGS. 3 and 4. Further, in the third embodiment, the mode when the plug 10B is disconnected from the socket 20B, the plug side shutoff valve V10 and the socket side shutoff valve V20 are closed is substantially the same as the second embodiment of FIGS. 3 and 4.

In FIG. 5, hydrogen gas (filled gas) leaks from the boundary between the through hole 220 and the plug protruding portion 12 during hydrogen gas filling, and the leaked filling gas Gf flows into the cylindrical space 243B of the extension portion 24B to increase the internal pressure of the cylindrical space 243B. When the internal pressure of the cylindrical space 243B increases, the slider 8B moves to the spring 9 side (left side in FIG. 5) to compress the spring 9 and increase the volume of the cylindrical space 243B. Further, when the cylindrical space 243B is boosted and the end surface on the opening portion side of the slider 8B comes into contact with the inner surface on the side separated from the plug 10B of the chamber 244B (left side in FIG. 5), the volume of the cylindrical space 243B does not increase any more.

The boosted hydrogen gas in the cylindrical space 243B can be released to the outside of the safety joint 100B from the small hole 245 for pressure release (the arrow Fbx in FIG. 6).

FIG. 6 shows a state in which the tip end portion of the plug protruding portion 12 is still located in the through hole 220 of the socket 20B in the process of disconnecting the plug 10B from the socket 20B. In FIG. 6, the tip of the plug protruding portion 12 in the plug 10B remains in the through hole 220 of the socket 20B, but the position of the plug protruding portion 12 is a position that does not hinder the lowering of the support member 60 even if it is pressed downward due to the elastic repulsive force of the socket side spring 40. That is, the right opening portion of the through hole 220 is closed by the plug protruding portion 12. Since the plug protruding portion 12 that has prevented the support member 60 from descending due to the elastic repulsive force of the socket side spring 40 is moving in the state of FIG. 6, the support member 60 interposed in the second flow path 223 of the socket 20B is instantaneously lowered by the elastic repulsive force of the socket side spring 40. As a result, the socket side shutoff valve V20 is closed and the flow of the filling gas is also shut off. The hydrogen gas existing on the downstream side (through hole 220) of the socket side valve body 30 when the socket side shutoff valve V20 is closed flows out as shown by the arrow Fbi shown by the dotted line in FIG. 6 and flows into the cylindrical space 243B to increase the internal pressure of the cylindrical space 243B. However, as described above, the internal pressure of the cylindrical space 243B can be reduced by releasing the gas from the small hole 245 for releasing the pressure of the cylindrical space 243B.

Figure 7:
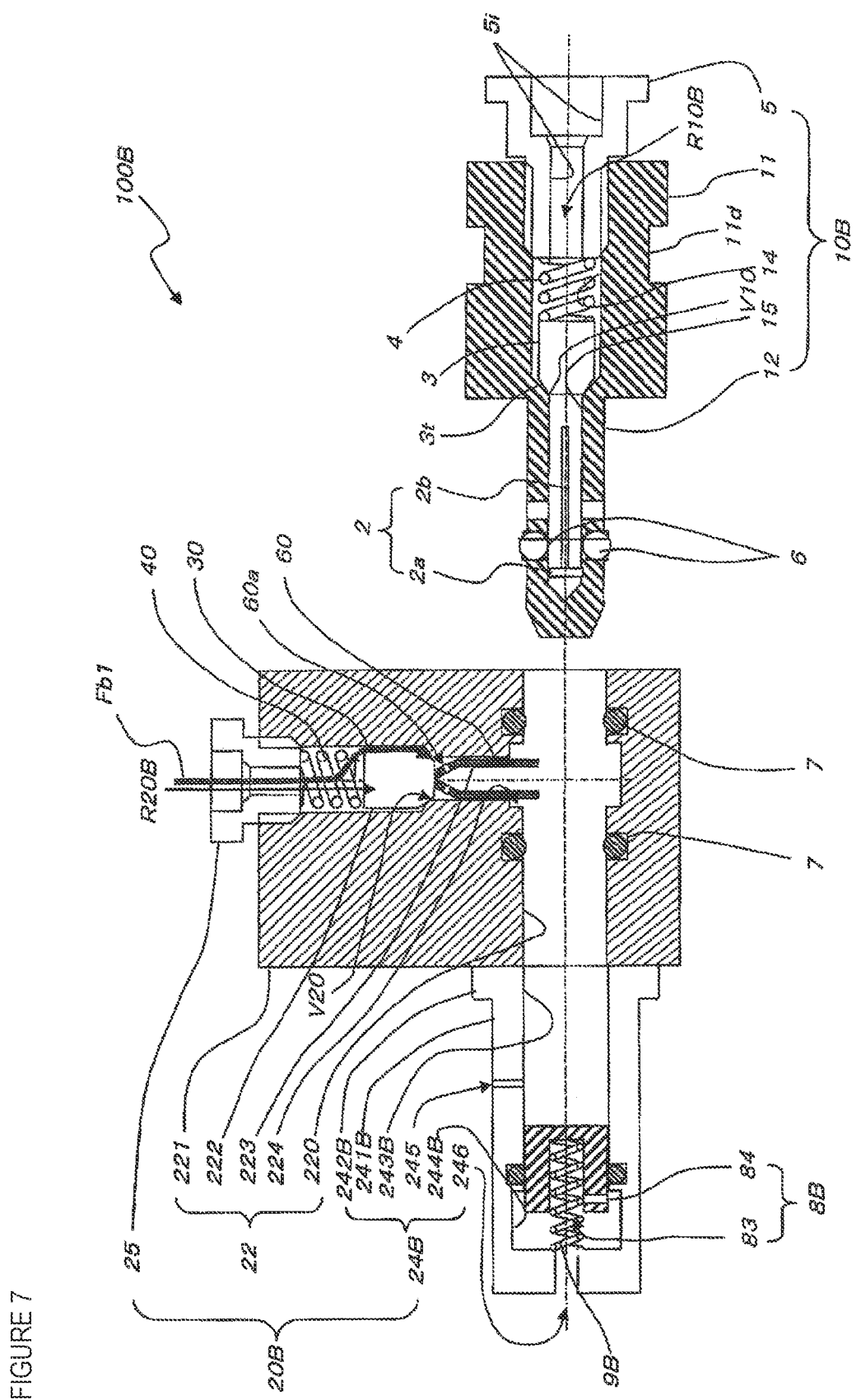
FIG. 7 is an explanatory cross-sectional view showing a state in which the protruding portion of the nozzle side member is disconnected from the filling apparatus side member in the third embodiment.

In FIG. 7, which shows a state in which the plug 10B is completely disconnected from the socket 20A, the right opening portion of the through hole 220 of the socket 20B is opened because (the plug protruding portion 12 of) the plug 10B is completely disconnected from the socket 20B. The internal pressure of the cylindrical space 243B is also lowered accordingly, and due to the elastic repulsive force of the spring 9B, the slider 8B moves on the side where the plug 10B is pulled out (right side in FIG. 7) from the state shown in FIG. 6 such that the spring 9B becomes in an extended state. Since the exhaust port 246 is formed on the left end side end surface of the extension portion 24B, even if the slider 8B moves to the right side in FIG. 7, outside air does not flow in from the exhaust port 246 and the inside of the chamber 244B does not become negative pressure.

In the third embodiment shown in FIGS. 5 to 7, the mode in which the plug side shutoff valve V10 is open when the plug 10B is not disconnected from the socket 20 and the mode in which the plug side shutoff valve V10 is closed when the plug 10B is disconnected from the socket 20 are the same as the modes described in the first embodiment shown in FIGS. 1 and 2. Other configurations and effects in the third embodiment shown in FIGS. 5 to 7 are the same as those of the second embodiment shown in FIGS. 3 and 4.

Since the embodiments shown in the drawings are merely examples, and the embodiments do not limit the technical scope of the present invention.

DESCRIPTION OF THE REFERENCE NUMERALS 2 piston
3 plug side valve body
4 coil spring
8 closing member
10 plug
12 plug side protruding portion
13 retention release rod
14 second flow path
15 first flow path
20 socket
24 extension portion
30 socket side valve body
40 coil spring
60 supporting member
100 safety joint

The invention claimed is:

1. A safety joint, including:
a cylindrical nozzle side member with a flow path formed inside, a shutoff valve of the nozzle side member opening when the nozzle side member is connected to a filling apparatus side member; and
the filling apparatus side member having a cylindrical shape and a flow path formed inside, the filling apparatus side member being connectible to the nozzle side member,
and when the nozzle side member is disconnected from the filling apparatus side member, the shutoff valve of the nozzle side member closes and the flow path of the filling apparatus side member closes, said safety joint is characterized in that:
central axes of the flow paths of the nozzle side member and the filling apparatus side member are arranged orthogonally;
the nozzle side member has a protruding portion with a diameter smaller than a region in which a valve body is housed, and the protruding portion is formed with a through hole that communicates the flow path of the nozzle side member and the flow path of the filling apparatus side member;
the filling apparatus side member has an opening portion into which the protruding portion of the nozzle side member is inserted, the opening portion extending in a direction orthogonal to the flow path of the filling apparatus side member;
the opening portion is provided with a slidable closing member and an elastic member that urges the slidable closing member in a direction that the nozzle side member comes off; and
said safety joint further incudes a closing member holding mechanism holding the slidable closing member at a position separated from the nozzle side member when the nozzle side member and the filling apparatus side member are connected.

2. The safety joint as claimed in claim 1, wherein no valve body is arranged in the flow path of the filling apparatus side member.

3. The safety joint as claimed in claim 2, further comprising an extension portion having a space in which the opening portion is extended in an opposite direction of the nozzle side member.

4. The safety joint as claimed in claim 2, wherein:
the closing member holding mechanism includes a long member and a rotation locking member;
the long member extends parallel to the opening portion of the filling apparatus side member, a first end of the long member is attached to an area where the valve body of the nozzle side member is housed, a second end of the long member extends to a vicinity of an end of the slidable closing member, separated from the nozzle side member, the second end is arranged at a position where the nozzle side member is locked to the rotation locking member when the nozzle side member is connected to the filling apparatus side member, and thereby provides a function of transmitting disengagement movement of the nozzle side member to the rotation locking member via the second end when the nozzle side member is disengaged from the filling apparatus side member; and
the rotation locking member is pivotally and rotatably supported, when the nozzle side member is connected to the filling apparatus side member, a first end of the rotation locking member engages with the end of the slidable closing member in such a manner as to prevent the nozzle side member from coming off the filling apparatus side member, a second end of the rotation locking member engages with the second end of the long member, when the nozzle side member comes off from the filling apparatus side member, movement of the nozzle member side is transmitted through the long member causing the first and second ends of the rotation locking member to rotate, and the engagement with the end of the slidable closing member is released.

5. The safety joint as claimed in claim 2, wherein a sealing material is arranged at the opening portion of the filling apparatus side member.

6. The safety joint as claimed in claim 1, further comprising an extension portion having a space in which the opening portion is extended in an opposite direction of the nozzle side member.

7. The safety joint as claimed in claim 1, wherein:
the closing member holding mechanism includes a long member and a rotation locking member;
the long member extends parallel to the opening portion of the filling apparatus side member, a first end of the long member is attached to an area where the valve body of the nozzle side member is housed, a second end of the long member extends to a vicinity of an end of the slidable closing member, separated from the nozzle side member, the second end is arranged at a position where the nozzle side member is locked to the rotation locking member when the nozzle side member is connected to the filling apparatus side member, and thereby provides a function of transmitting disengagement movement of the nozzle side member to the rotation locking member via the second end when the nozzle side member is disengaged from the filling apparatus side member; and
the rotation locking member is pivotally and rotatably supported, when the nozzle side member is connected to the filling apparatus side member, a first end of the rotation locking member engages with the end of the slidable closing member in such a manner as to prevent the nozzle side member from coming off the filling apparatus side member, a second end of the rotation locking member engages with the second end of the long member, when the nozzle side member comes off from the filling apparatus side member, movement of the nozzle member side is transmitted through the long member causing the first and second ends of the rotation locking member to rotate, and the engagement with the end of the slidable closing member is released.

8. The safety joint as claimed in claim 1 wherein a sealing material is arranged at the opening portion of the filling apparatus side member.

* * * * *